US011599809B2

(12) United States Patent
Hatfield et al.

(10) Patent No.: US 11,599,809 B2
(45) Date of Patent: Mar. 7, 2023

(54) ACTIVITY RECOMMENDATIONS BASED ON IOT AND SOCIAL MEDIA

(71) Applicant: International Business Machines Corporation, Armonk, NY (US)

(72) Inventors: Jennifer M. Hatfield, San Francisco, CA (US); Michael Bender, Rye Brook, NY (US); Randall Avery Craig, Raleigh, NC (US); Tom Brugler, Fuquay Varina, NC (US); Corey Sonier, Baton Rouge, LA (US); Chris Degnen, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 16/936,399

(22) Filed: Jul. 22, 2020

(65) Prior Publication Data

US 2022/0027751 A1      Jan. 27, 2022

(51) Int. Cl.
*G06N 5/04* (2006.01)
*G06Q 50/00* (2012.01)
(Continued)

(52) U.S. Cl.
CPC .............. *G06N 5/04* (2013.01); *G06N 20/00* (2019.01); *G06Q 10/1093* (2013.01);
(Continued)

(58) Field of Classification Search
CPC ....... H04L 67/12; H04L 67/52; H04L 67/535; G06N 5/04; G06N 20/00; G06Q 10/1093;
(Continued)

(56) References Cited

U.S. PATENT DOCUMENTS 7,069,258 B1   6/2006  Bothwell
7,212,922 B1   5/2007  Monisha
(Continued)

FOREIGN PATENT DOCUMENTS

WO        2014093856 A1     6/2014

OTHER PUBLICATIONS

Khuhfash, "Foresee Is the Weather App That Lets You Plan for the Future", Jun. 22, 2017, 4 pps., <https://appadvice.com/review/quickadvice-foresee>.

*Primary Examiner* — Benjamin M Thieu
(74) *Attorney, Agent, or Firm* — Michael A. Petrocelli

(57) ABSTRACT

Aspects of the present invention disclose a method for recommending an activity based on a social media profile, IoT devices, and historical engagements of the user. The method includes one or more processors determining a past activity of a user based at least in part on social media posts and internet of things (IoT) enabled devices of the user. The method further includes determining a set of historical conditions corresponding to the past activity, wherein the set of conditions correspond to a positive sentiment of the user. The method further includes identifying a location of the user. The method further includes generating an activity recommendation based on the location of the user and the set of historical conditions corresponding to the past activity, wherein the activity recommendation includes a set of future conditions of a future activity, wherein the set of future conditions correlate with the set of historical conditions.

20 Claims, 3 Drawing Sheets

(51) Int. Cl.
*G06N 20/00* (2019.01)
*G06Q 10/1093* (2023.01)
*H04W 4/02* (2018.01)
*H04L 67/12* (2022.01)
*G16Y 20/40* (2020.01)
*G06Q 30/0201* (2023.01)
*G16Y 10/65* (2020.01)

(52) U.S. Cl.
CPC ............ *G06Q 50/01* (2013.01); *H04L 67/12* (2013.01); *H04W 4/02* (2013.01); *G06Q 30/0201* (2013.01); *G16Y 10/65* (2020.01); *G16Y 20/40* (2020.01)

(58) Field of Classification Search
CPC ..... G06Q 50/01; G06Q 30/0201; H04W 4/02; H04W 4/21; H04W 4/70; G16Y 10/65; G16Y 20/40
See application file for complete search history.

(56) References Cited

U.S. PATENT DOCUMENTS

| | | | |
|---|---|---|---|
| 2013/0024203 A1 | 1/2013 | Flores | |
| 2015/0127263 A1 | 5/2015 | Praun | |
| 2015/0324751 A1* | 11/2015 | Orenstein | G16H 40/67 |
| | | | 702/3 |
| 2016/0117372 A1 | 4/2016 | Krafft | |
| 2016/0196493 A1 | 7/2016 | Glynn | |
| 2018/0241829 A1* | 8/2018 | Edwards | H04L 67/535 |
| 2018/0300739 A1 | 10/2018 | Ingle | |
| 2019/0199761 A1* | 6/2019 | Felman | H04L 67/55 |

\* cited by examiner

ACTIVITY RECOMMENDATIONS BASED ON IOT AND SOCIAL MEDIA

BACKGROUND OF THE INVENTION

The present invention relates generally to mobile devices, and more particularly to activity recommendations based on social media of a user and a plurality of Internet of Things (IoT) enabled devices.

In recent years, developments and the growth of Internet of Things (IoT) capable devices have created a wealth of opportunities to advance the capabilities to integrate systems. The Internet of things (IoT) is the internetworking of physical devices (also referred to as "connected devices" and "smart devices"), vehicles, buildings, and other items, embedded with electronics, software, sensors, actuators, and network connectivity that enable these objects to collect and exchange data. The IoT allows objects to be sensed and/or controlled remotely across existing network infrastructure, creating opportunities for more direct integration of the physical world into computer-based systems, and resulting in improved efficiency, accuracy, and economic benefit in addition to reduced human intervention. Each thing is uniquely identifiable through its embedded computing system but is able to interoperate within the existing Internet infrastructure.

Social media is an interactive computer-mediated technology that facilitates the creation and sharing of information through virtual communities and networks. User-generated content, such as text posts or comments, photos, videos, and data generated through online interactions are the lifeblood of social media. Users usually access social media services via web-based technologies on desktops and laptops, or download services that offer social media functionality to their mobile devices (e.g., smartphones and tablets).

SUMMARY

Aspects of the present invention disclose a method, computer program product, and system for recommending an activity engagement to a user based on a social media profile, IoT devices, and historical engagements of the user. The method includes one or more processors determining a past activity of a user based at least in part on social media posts and internet of things (IoT) enabled devices of the user. The method further includes one or more processors determining a set of historical conditions corresponding to the past activity, wherein the set of conditions correspond to a positive sentiment of the user. The method further includes one or more processors identifying a location of the user. The method further includes one or more processors generating an activity recommendation based on the location of the user and the set of historical conditions corresponding to the past activity, wherein the activity recommendation includes a set of future conditions of a future activity, wherein the set of future conditions correlate with the set of historical conditions.

DETAILED DESCRIPTION

Embodiments of the present invention allow for a cognitive solution of ingesting sentiment and use of social media to determine activities for a user. Embodiments of the present invention determine one or more activities a user participates in based on social media posts and Internet of things (IoT) devices and a level of satisfaction for the one or more activities. Embodiments of the present invention determine a set of conditions for the one or more activities based on conditions at the time of the one or more activities. Additional embodiments of the present invention predict crowd and travel route densities corresponding to the one or more activities and provide a user interface to modify preferences for crowd and travel route densities. Further embodiments of the present invention generate activity recommendations for the user based at least in part on historical references, current conditions, and frequency of user engagement in an activity.

Some embodiments of the present invention recognize that activities exist that are more difficult to access and fully enjoy due to extremities in weather conditions and/or large populations of people. For example, due to countless unknown factors (e.g., weather, crowd size, etc.) the ability to schedule and/or modify activities can be a challenge. Various embodiments of the present invention remedy this challenge by predicting weather at a location using crowd sourcing data and real-time activity navigation of traffic, crowds, and group contacts. Also, embodiments of the present invention providing activity recommendations to a user by determining interests of the user from monitoring social media and IoT devices and comparing identified activities to historical conditions and transmitting recommendations when the conditions and timing match historical interest of the user.

Embodiments of the present invention can operate to improve the efficiency of network resources by reducing the amount of data the network has to transmit by reducing the amount data transmitted to recipients of a subscriber list whose preferences do not match current activity conditions. Additionally, various embodiments of the present invention can operate to increase efficiency of a computer system by reducing the amount of memory resources utilized by reducing the size of subscriber lists.

Implementation of embodiments of the invention may take a variety of forms, and exemplary implementation details are discussed subsequently with reference to the Figures.

Figure 1:
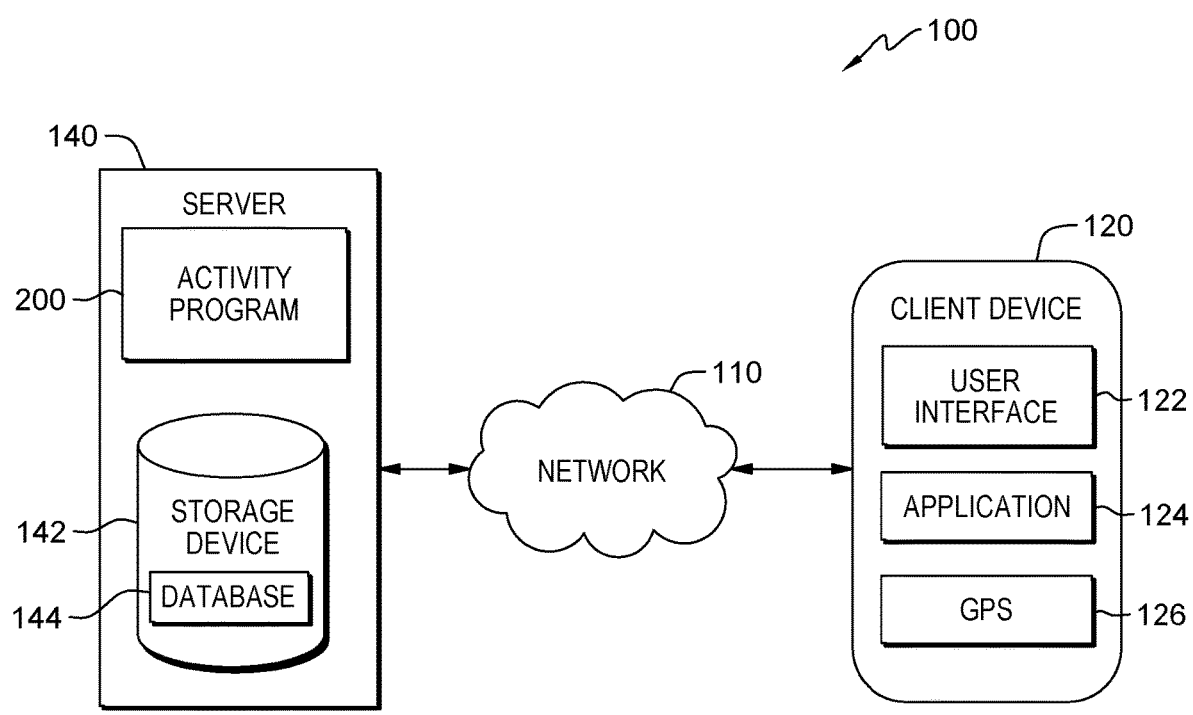
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as database 144, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Activity program 200 enables the authorized and secure processing of personal data. Activity program 200 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Activity program 200 provides information regarding personal data and the nature (e.g., type, scope, purpose, duration, etc.) of the processing. Activity program 200 provides the user with copies of stored personal data. Activity program 200 allows the correction or completion of incorrect or incomplete personal data. Activity program 200 allows the immediate deletion of personal data.

Distributed data processing environment 100 includes server 140 and client device 120, all interconnected over network 110. Network 110 can be, for example, a telecommunications network, a local area network (LAN) a municipal area network (MAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 140 and client device 120, and other computing devices (not shown) within distributed data processing environment 100.

Client device 120 can be one or more of a laptop computer, a tablet computer, a smart phone, smart watch, a smart speaker, virtual assistant, or any programmable electronic device capable of communicating with various components and devices within distributed data processing environment 100, via network 110. In general, client device 120 represents one or more programmable electronic devices or combination of programmable electronic devices capable of executing machine readable program instructions and communicating with other computing devices (not shown) within distributed data processing environment 100 via a network, such as network 110. Client device 120 may include components as depicted and described in further detail with respect to FIG. 3, in accordance with embodiments of the present invention.

Client device 120 includes user interface 122, application 124, and GPS 126. In various embodiments of the present invention, a user interface is a program that provides an interface between a user of a device and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, or other media, etc.). In one embodiment, application 124 is mobile application software. For example, mobile application software, or an "app," is a computer program designed to run on smart phones, tablet computers and other mobile devices. In another example, application 124 is an internet of things (IoT) application utilized to transmit and receive data between one or more IoT-enabled devices connected to network 110. In another embodiment, application 124 is a web user interface (WUI) and can display text, documents, web browser windows, user options, application interfaces, and instructions for operation, and include the information (such as graphic, text, and sound) that a program presents to a user and the control sequences the user employs to control the program. In another embodiment, application 124 is a client-side application of activity program 200.

GPS 126 is a satellite-based radio-navigation system that provides geolocation and time information to a GPS receiver anywhere there is an unobstructed line of sight. For example, GPS 126 does not require mobile device (e.g., client device 120) of a user to transmit any data and operates independently of any telephonic or internet reception. In this example, GPS 126 provides location and timestamp information of a user when engaged in an activity.

In various embodiments of the present invention, server 140 may be a desktop computer, a computer server, or any other computer systems, known in the art. In general, server 140 is representative of any electronic device or combination of electronic devices capable of executing computer readable program instructions. Server 140 may include components as depicted and described in further detail with respect to FIG. 3, in accordance with embodiments of the present invention.

Server 140 can be a standalone computing device, a management server, a web server, a mobile computing device, or any other electronic device or computing system capable of receiving, sending, and processing data. In one embodiment, server 140 can represent a server computing system utilizing multiple computers as a server system, such as in a cloud computing environment. In another embodiment, server 140 can be a laptop computer, a tablet computer, a netbook computer, a personal computer (PC), a desktop computer, a personal digital assistant (PDA), a smart phone, or any programmable electronic device capable of communicating with client device 120 and other computing devices (not shown) within distributed data processing environment 100 via network 110. In another embodiment, server 140 represents a computing system utilizing clustered computers and components (e.g., database server computers, application server computers, etc.) that act as a single pool of seamless resources when accessed within distributed data processing environment 100.

Server 140 includes storage device 142, database 144, and activity program 200. Storage device 142 can be implemented with any type of storage device, for example, persistent storage 305, which is capable of storing data that may be accessed and utilized by client device 120 and server 140, such as a database server, a hard disk drive, or a flash memory. In one embodiment storage device 142 can represent multiple storage devices within server 140.

In various embodiments of the present invention, storage device 142 stores a plurality of information, such as database 144. Database 144 may represent one or more organized collections of data stored and accessed from server 140. For example, database 144 includes weather conditions, crowd size conditions, travel conditions, historical data, user engagement frequency, locations, sentiment, crowd source data, user preferences, etc. In one embodiment, data processing environment 100 can include additional servers (not shown) that host additional information that accessible via network 110. Additional embodiments of the present invention predict crowd and travel route densities corresponding to the one or more activities and provide a user interface to modify preferences for crowd and travel route densities.

Activity program 200 can recommend an activity engagement to a user based on a social media profile, IoT devices, and historical engagements of the user. Additionally, activity program 200 can predict crowds and optimize activity engagement while factoring in weather, route, and location. Generally, activity program 200 can predict a defined timeframe in order for a user to participate in outdoor activities by utilizing a cognitive model that determines the weather, time, day, crowd prediction, and travel distance for a set of conditions based on historical activity data of the user.

In one embodiment, activity program 200 transmits a generated activity recommendation to client device 120. For example, activity program 200 transmit a notification to a mobile device (e.g., client device 120) of the user that include upcoming weather changes that trigger new activities, change, or cancel existing events of a calendar application (e.g., application 124) of the mobile device. Additionally, activity program 200 can utilize preferences and current location for one or more users. Also, activity program 200 can utilize attributes of desired location (e.g., current crowd size, predicted crowd size, available parking, hotel rooms or camping spaces, available seating/reservations, etc.). In this example, activity program 200 utilizes available data (e.g., attributes, preferences, IoT device data, etc.) to train a cognitive engine based on frequency of the user completing an activity in various sets of conditions to provide an improved activity planner for the user.

In another embodiment, a location that caters to frequent outdoor enthusiasts (e.g. ski resort) can utilize activity program 200 as a service to registered visitors. As a result, activity program 200 provides the ski resort the ability increase visits of the frequent outdoor enthusiasts in conditions that meet the preferences of the frequent outdoor enthusiasts. In yet another embodiment, activity program 200 can be utilized in an IoT fitness device (e.g. client device 120) as an add-on (e.g., application 124) to compare environmental conditions when a user schedules to participate in an activity with a current set of conditions of a location of the activity.

Figure 2:
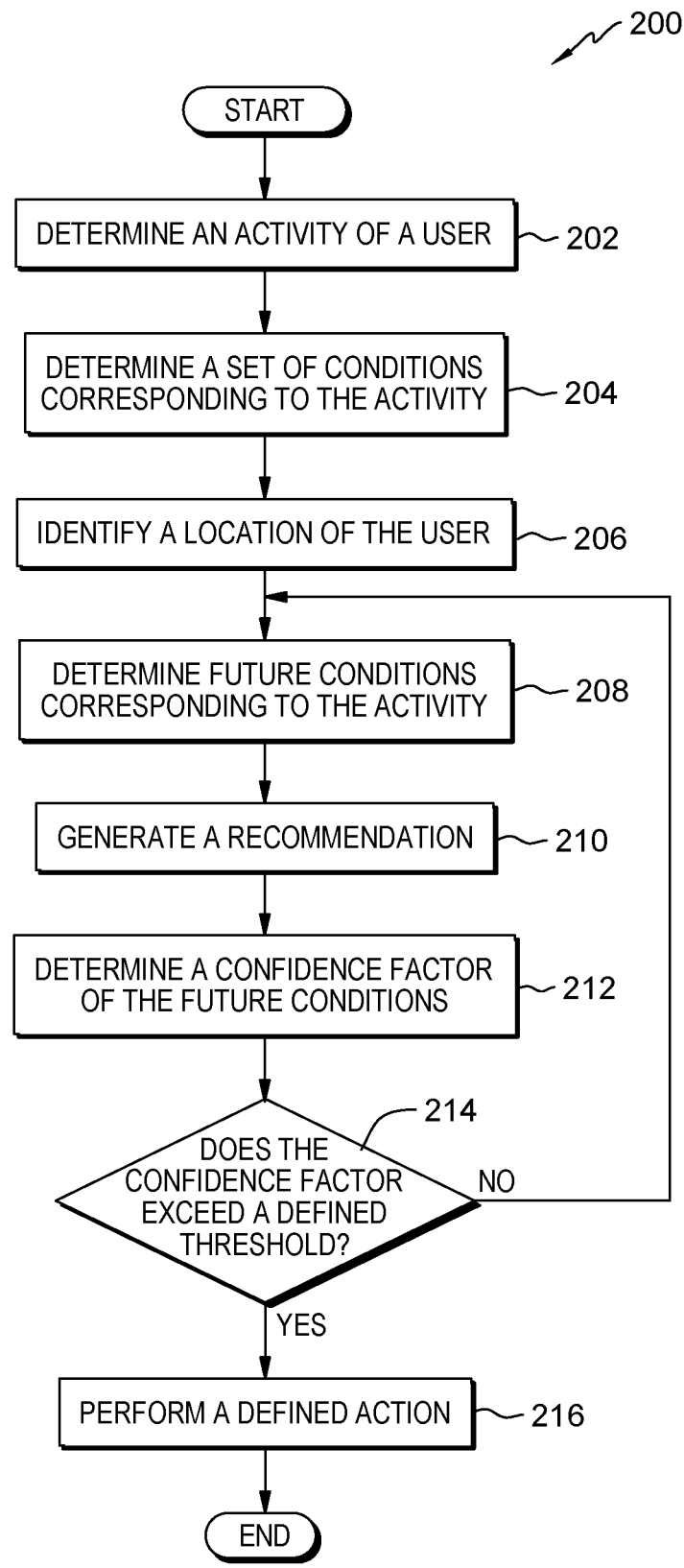
FIG. 2 is a flowchart depicting operational steps of a program, within the data processing environment of FIG. 1, for recommending an activity engagement to user based on a social media profile and IoT devices, in accordance with embodiments of the present invention.

FIG. 2 is a flowchart depicting operational steps of activity program 200, a program that recommends an activity engagement to user based on a social media profile, IoT devices, and historical engagements of the user, in accordance with embodiments of the present invention. In one embodiment, activity program 200 initiates in response to a user connecting client device 120 to activity program 200 through network 110. For example, activity program 200 initiates in response to a user registering (e.g., opting-in) each of a plurality of IoT devices (e.g., client device 120) with activity program 200 via a WLAN (e.g., network 110). In another embodiment, activity program 200 is a background application that continuously monitors client device 120. For example, activity program 200 is a client-side application (e.g., application 124) that initiates upon booting of each of a plurality of IoT enabled devices (e.g., client device 120) of a user and monitors data of each of the IoT enabled devices.

In step 202, activity program 200 determines an activity of a user. In various embodiments of the present invention, an activity includes undertakings that are performed within the phenomena of the physical world collectively, including plants, animals, the landscape, and other features and products of the earth. In one embodiment, activity program 200 utilizes data of client device 120 to identify an activity of a user. For example, activity program 200 determines an activity of a user and/or group of users using social media posts and IoT devices (e.g., client device 120) of the user and/or group of users. In this example, activity program 200 utilizes unstructured text (e.g., data) of one or more posts of the user from a social media along with GPS and timestamp data of a fitness device (e.g., client device 120, IoT device, etc.) of the user to identify a location, time, and activity a user participates in. Additionally, activity program 200 aggregates one or more identified past activities derived from the social media posts and IoT devices over a period of time to create a knowledge base of activities of the user. Also, activity program 200 can utilize the knowledge base of past activities of the user to identify future activities when generating a recommendation (as discussed in step 210).

In another example, activity program 200 determines a location of an activity of a user based on a location corresponding to a social media post that includes an identified activity. In yet another example, activity program 200 continuously monitors one or more IoT devices (e.g., client device 120) and social media profiles that a user registers with activity program 200 and compiles a database (e.g., database 144) of the frequency of the user participating in a respective activity.

In step 204, activity program 200 determines a set of conditions corresponding to the activity. In various embodiments of the present invention a set of conditions may include weather, sentiment of the user, crowd size, travel, condition elements, location attributes, etc. Location attributes may include available parking, hotel rooms, camping spaces, and/or available seating/reservations. In one embodiment, activity program 200 determines a set of conditions of an activity of database 144. For example, activity program 200 identifies an activity of a database (e.g., database 144) that corresponds to a user and generates a set of conditions based on a location of the activity. In this example, activity program 200 use data of weather feeds (e.g., application 124, remote servers, etc.) and crowdsourcing data to determine traffic patterns, number of people at activity location, weather conditions, etc. that correspond to the activity location at the time the activity was in progress. Additionally, activity program 200 extracts text from a social media post of the user corresponding to the activity and determines the sentiment of the social media post. Also, activity program 200 correlates the sentiment (e.g., positive, negative, neutral) with the set of conditions of the activity and stores the information in a historical database (e.g., database 144).

In an example embodiment, a user is an avid skier and enjoys skiing in Location A, which is an hour away (e.g., location conditions). In this example embodiment, activity program 200 utilizes social media of one or more posts on a social media profile of the user and determines that the user enjoys (e.g., positive sentiment) skiing (e.g., activity) when the temperature is 25 degrees Fahrenheit and 12 inches of snow the previous day (e.g., weather conditions). Additionally, activity program 200 stores the activity, sentiment, and conditions in a database (e.g., database 144).

In step 206, activity program 200 identifies a location of the user. In various embodiments of the present invention, activity program 200 provides a user with capability to automatically determine a location of the user or allow the user to specify a location via an interface (e.g., user interface 132). In one embodiment, activity program 200 utilizes client device 120 to determine a location of a user. For example, activity program 200 utilizes GPS data of a smart watch (e.g., client device 120) of a user to determine a location of the user. In this example, activity program 200 retrieves GPS data of the smart watch of the user and identifies a current location of the user. Additionally, activity program 200 transmits the location to a database of a server (e.g., server 140). In another example, activity program 200 can receive location inputs of a user from an application (e.g., navigation, social media post, WUI query, etc.) of a mobile device (e.g., client device 120).

In another embodiment, activity program 200 utilizes a determined location of a user to identify one or more activities of database 144 within a predefined distance of the determined location. For example, activity program 200 utilizes a determined location (e.g., GPS 126) of a user to determine one or more activities correlated to an activity of the knowledge base (e.g., historical activity data, database 144, etc.) the user. In this example, activity program 200 uses the determined location to identify one or more activities available within a defined area (e.g., the predefined distance) of the determined location. Additionally, activity program 200 can use a machine learning algorithm (e.g., natural language processing, string matching, etc.) to identify one or more activities within the defined area that corresponds to an activity of a knowledge base of the user which includes a positive, neutral, or negative sentiment, of the database (e.g., database 144) that correlates to each of the historical activities of the user identified in step 202. Alternatively, activity program 200 can retrieve a list of activities corresponding to the determined location from one or more uniform resource locators (URLs) (e.g., search engine results) or applications (e.g., navigational applications) and utilize the machine learning algorithm to identify one or more activities that correlate to the knowledge base of the user.

In step 208, activity program 200 determines future conditions corresponding to the activity. In one embodiment, activity program 200 utilizes data of database 144 to predict a set of conditions corresponding to an activity. For example, activity program 200 uses a machine learning algorithm and historical data (e.g., weather feeds, crowd data, location attributes, traffic data, etc.) of a database (e.g., database 144) to determine a future set of conditions corresponding to an identified activity of a determined location (as discussed in step 206). Additionally, activity program 200 utilizes a subset of historical activity data (e.g., knowledge base, database 144) to train the machine learning algorithm to determine the future set of conditions corresponding to the identified activity of the determined location. In this example, activity program 200 uses the machine learning algorithm to predict the future set of conditions (e.g., time, date, crowd size, travel distance, travel times, etc.) corresponding to the identified activity of the determined location. Furthermore, activity program 200 inputs a GPS coordinates corresponding to the determined location (as discussed in step 206) into the machine learning algorithm to determine future weather conditions (e.g., precipitation amounts, wind velocity, temperatures, surf, etc.) corresponding to the determined location. In an alternative example, activity program 200 can use the machine learning algorithm trained with historical data (e.g., publicly available cameras, crowdsourced data of major events, hotel reservations, flight reservation, car rentals, etc.) to determine one or more crowd sizes and/or travel routes of the determined location for a plurality of dates and corresponding times in the future.

In the example embodiment, activity program 200 uses a location of the user (e.g., hotel location of a reservation, geolocation of GPS, etc.) to identify Location B (e.g., a ski resort) 45 minutes away (e.g., predefined distance) from the location of the user. Additionally, activity program 200 uses a machine learning algorithm to determine a set conditions for a last date during a week-long stay of the user at Location B. In this example embodiment, activity program 200 determines that on the last date of the stay the temperature will be 27 degrees Fahrenheit and on the previous day there will be at least 10 inches of snow (e.g., weather conditions).

In step 210, activity program 200 generates a recommendation. In various embodiments of the present invention, activity program 200 provides a user with an interface (e.g., user interface 122) to modify frequency of activities (e.g., number of days) and weights of conditions, which may be grouped according to type (e.g., weather, travel, crowd size, etc.), when generating an activity recommendation. In one embodiment, activity program 200 generates an activity recommendation corresponding to a user. For example, activity program 200 determines a frequency (e.g., number of user engagements over a defined period of time) of an activity resulting in a positive user experience. In this example, activity program 200 determines a set of conditions associated with the activity based on each instance of the activity in the frequency (e.g., historical data). Additionally, activity program 200 compares a future set of conditions corresponding to the activity of a location (discussed in step 208) with the set of conditions of the activity of the frequency to identify common condition elements and generate an activity recommendation to the user. Additionally, activity program 200 provides an interface (e.g., user interface 122) to allow the user to input a preference that adjusts the frequency and a weight of conditions of the activity (i.e., ability to adjust the weight of factors used to generate a recommendation).

In another example, activity program 200 compares current weather conditions of a location of an event of a calendar (e.g. application 124) of a mobile device (e.g., client device 120) of a user to a future set of conditions and determines that the current weather conditions for the event will change. In this example, activity program 200 can generate a recommendation to modify (e.g., cancel, reschedule, recommend a different activity, etc.) the calendar with respect to the event. In yet another example, activity program 200 compares a future set of conditions to a set of conditions of one or more users of a contact list to identify condition matches. In this example, activity program 200 utilizes the identified conditions matches to select users of the contact list and generated a custom correspondence list of users.

In step 212, activity program 200 determines a confidence factor of the future conditions. In various embodiments of the present invention, a confidence factor may provide an indication of whether a future set of conditions for an activity of a location will result in a positive experience for a user based on conditions derived from historical data (e.g., past user engagement in an activity). In one embodiment, activity program 200 determines a confidence factor of a future set of conditions corresponding to a generated recommendation. For example, activity program 200 utilizes historical data (e.g., historical conditions) to determine a confidence factor of a generated recommendation to a user using a future set of conditions corresponding to the activity with respect to a location. In this example, activity program 200 uses a dataset of a frequency of user engagement (e.g., historical data) that includes a condition element (e.g., temperature) of a condition (e.g., weather) of one or more sets of conditions of the frequency to determine a standard deviation of the condition element of the frequency.

Additionally, activity program 200 determines whether a condition element, which correlates with the condition element of the frequency (e.g., temperature), of a future set of conditions is within one (1) standard deviation of the condition element of the frequency. Also, activity program 200 determines whether one or more condition elements (e.g., precipitation, wind velocity, temperatures, surf, travel time, routes, etc.) corresponding to the condition (e.g., weather) are within one (1) standard deviation of a respective condition element of the frequency, and increase the confidence factor value corresponding to the condition (e.g., weather) incrementally until a cap associated with a weight of the condition (e.g., weather) is reached based on the aforementioned methodology. Moreover, activity program 200 determines a respective confidence value for one or more conditions (e.g., weather, travel, crowd size, etc.) of the future set of conditions based on respective condition elements (e.g., traffic patterns, distance, travel time, routes, location attributes, etc.) to generate an overall confidence factor value for the generated recommendation.

In the example embodiment, activity program 200 compares a first set of conditions (e.g., ski trip of Location A) to a second set of conditions (the ski resort of Location B) and assigns the ski resort recommendation a confidence factor of zero (0) to one (1) on a scale of zero (0) to one (1). Additionally, activity program 200 can assign a weight to various conditions and condition elements of the confidence factor (e.g., travel and weather conditions are assigned a weight of 0.5). In this example embodiment, activity program 200 determines that the 45-minute travel time (e.g., travel condition) of the second set of conditions is within a standard deviation of the travel time of the first set of conditions (e.g., 1 hour) and assigns the travel conditions a confidence factor value of (0.5).

Additionally, activity program 200 assigns each condition element (e.g., snowfall, temperature) of the weather conditions of the second set of conditions a weight of (0.25). Furthermore, activity program 200 determines that the temperature of 27 degrees (e.g., weather condition element) of the second set of conditions is within a standard deviation of the temperature of the first set of conditions (e.g., 25 degrees) and assigns the weather condition element a confidence factor value of (0.25). However, activity program 200 determines that the snowfall of 10 inches (e.g., weather condition element) of the second set of conditions is not within a standard deviation of the snowfall of the first set of conditions (e.g., 12 inches) and assigns the weather condition element a confidence factor value of (0). As a result, activity program 200 assigns the ski resort recommendation a confidence factor of (0.75) on a scale of (0) to (1.0).

In decision step 214, activity program 200 determines whether confidence factor exceeds a defined threshold. In one embodiment, activity program 200 determines whether a confidence factor of a generated activity recommendation exceeds a defined threshold. For example, activity program 200 determines whether an overall confidence factor value, which corresponds to a composite of respective confidence factor values of weather, travel, and/or crowd size conditions, for a generated recommendation is greater than a confidence factor threshold value. In this example, activity program 200 utilizes the confidence factor threshold value to determine whether to perform a defined action.

If activity program 200 determines that an overall confidence factor value for a generated recommendation is less than or equal to a confidence factor threshold value (decision step 214, "NO" branch), then activity program 200 determines an additional set of future conditions to generate an additional activity recommendation (step 208). In one scenario, activity program 200 determines that a generated recommendation has of an overall confidence factor value (0.75), which is less than a confidence factor threshold value (0.8), and activity program 200 does not initiate a communication with a computing device (e.g., client device 120) of a user. As a result, activity program 200 continues to determine sets of future conditions to generate activity recommendations.

In an example embodiment, a user enjoys skiing with a temperature between 20 and 25 degrees and 5 inches of snowfall (e.g., weather conditions). In this example embodiment, activity program 200 determines that the user does not enjoy skiing when the temperature is below 5 degrees (i.e., negative experience). Additionally, activity program 200 determines that future weather conditions in future include temperatures below 5 degrees and 7 inches of snowfall and assigns the future weather conditions an overall confidence factor value (0.5) on a scale of (0) to (1) based on a confidence factor value of (0) for the temperature and confidence factor value of (0.5) for the snowfall. Also, activity program 200 determines that the overall confidence factor value (0.5) is less than a confidence factor threshold value (0.8) and does not transmit the skiing recommendations to the user (i.e. activity program 200 has determined that the user will not enjoy the day).

In another example embodiment, a user enjoys roller blading when a park has less than 50 people (e.g., crowd size condition). In this example embodiment, activity program 200 determines that while the park has less than 50 people now, a determined set of future conditions determine that the park will include 100 visitors. Additionally, activity program 200 determines that future crowd size conditions include at least 100 visitors and assigns the future crowd size conditions an overall confidence factor value (0.5) on a scale of (0) to (1) based on an overall confidence factor value of (0.5) for the at least 100 people, which is less than a confidence factor threshold value (0.8) and does not transmit the skating recommendations to the user.

If activity program 200 determines that an overall confidence factor value for a generated recommendation is greater than a confidence factor threshold value (decision step 214, "YES" branch), then activity program 200 performs a defined action (step 216). In one scenario, activity program 200 determines that a generated recommendation has of an overall confidence factor value (0.75), which is greater than a confidence factor threshold value (0.7), and activity program 200 does initiates a communication with a computing device (e.g., client device 120) of a user to perform one or more defined actions (discussed in step 216).

In step 216, activity program 200 performs a defined action. In one embodiment, activity program 200 initiates a communication to client device 120. For example, activity program 200 modifies one or more entries of a calendar application (e.g., application 124). In this example, activity program 200 removes or reschedules an event of the calendar application. Additionally, activity program 200 can add a recommended event to the calendar application. In another example, activity program 200 transmits a generated activity recommendation to a computing device (e.g., client device 120) of a user. In this example, activity program 200 transmits an alert to the computing device of the user that includes the generated activity recommendation.

In yet another example, activity program 200 generates a custom email subscriber list of users based on a generated activity recommendation. In this example, activity program 200 add or remove one or more users of a database (e.g., database 144) of users from an email list based on activity preferences (e.g., a set of conditions) corresponding to each of the users. Additionally, activity program 200 transmits a communication to the users of the custom email subscriber list. Also, activity program 200 improves network efficiency by preventing transmission of data packets corresponding to the generated activity recommendation to users with activity preferences that vary from the generated activity recommendation, which reduces the amount of network resources utilized.

More specifically, in response to activity program 200 determining that an overall confidence factor value for a generated recommendation is greater than a confidence factor threshold value (decision step 214, "YES" branch), activity program 200 performs a defined action. In one scenario, if activity program 200 assigns a ski resort recommendation a confidence factor of (0.75), which is greater than a confidence factor threshold value of (0.7), then activity program 200 adds skiing reservation details to an event of a calendar application (e.g., application 124) a mobile device (e.g., client device 120) of a user. In another scenario, if activity program 200 determines that an overall confidence factor value for a generated recommendation, which includes waves are between 5 and 10 feet (e.g., weather conditions), is greater than a confidence factor threshold value, then activity program 200 can compile an email list of surfers from a database (e.g., database 144) that have activity preferences (e.g., skill, safety, ratings, etc.) in a profile corresponding to the surfers and transmit the recommendation to recipients of the email list.

Figure 3:
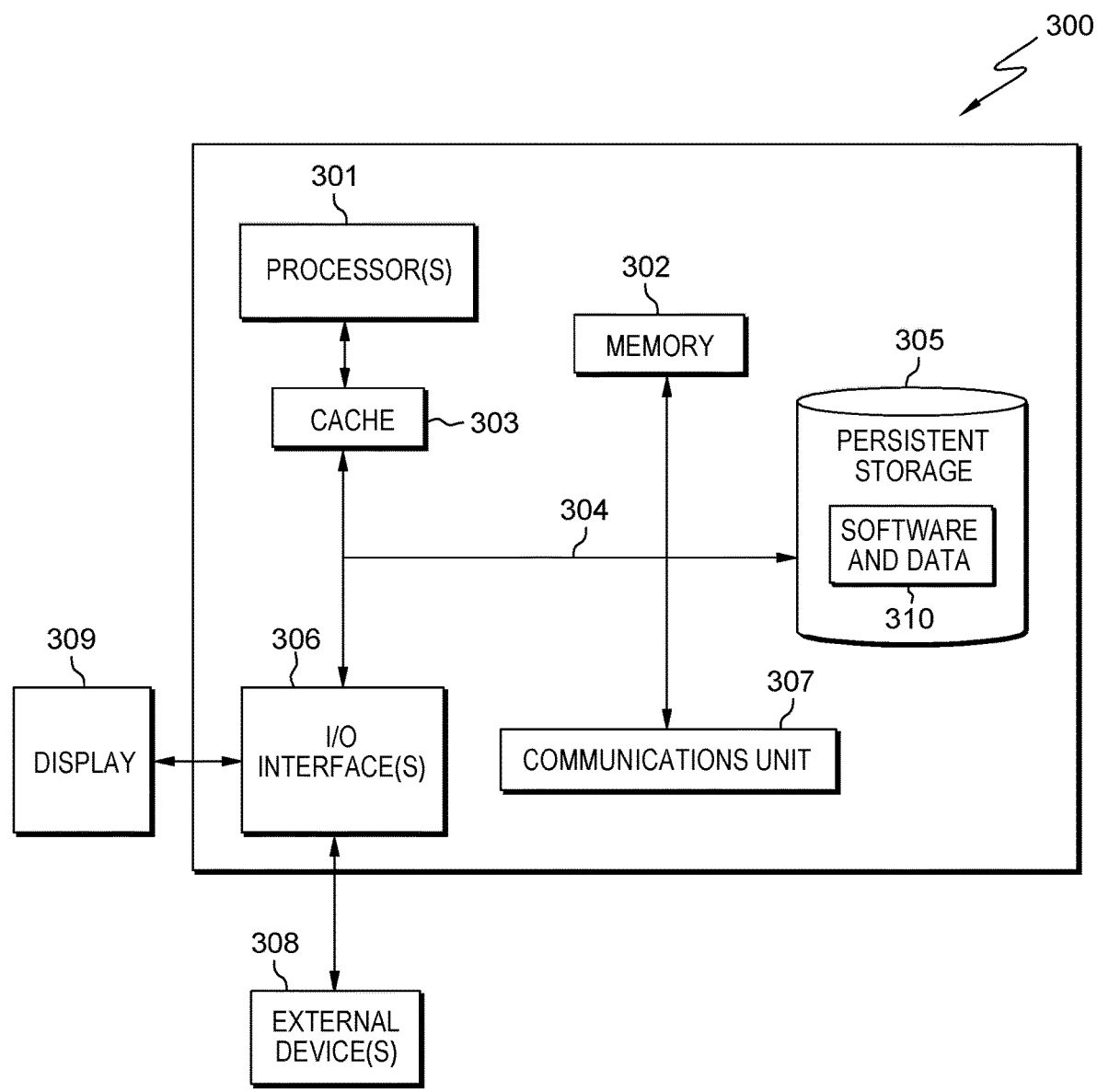
FIG. 3 is a block diagram of components of FIG. 1, in accordance with an embodiment of the present invention.

FIG. 3 depicts a block diagram of components of client device 120 and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

FIG. 3 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to client device 120, software and data 310 includes data of user interface 122 and application 124. With respect to server 140, software and data 310 includes data of storage device 142, database 144, and activity program 200.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   determining, by one or more processors, a past activity of a user based at least in part on social media posts and internet of things (IoT) enabled devices of the user;
   determining, by one or more processors, a set of historical conditions corresponding to the past activity;
   identifying, by one or more processors, a location of the user;
   generating, by one or more processors, an activity recommendation based on the location of the user and the set of historical conditions corresponding to the past activity, wherein the activity recommendation includes a set of future conditions of a future activity, wherein the set of future conditions correlate with the set of historical conditions; and
   determining, by one or more processors, a confidence factor value of the set of future conditions of the future activity based at least in part on the set of historical conditions corresponding to the past activity, the confidence factor value providing an indication of the set of future conditions of the future activity corresponding to a positive sentiment of the user.

2. The method of claim 1, further comprising:
   determining, by one or more processors, whether the confidence factor value of the set of future conditions is greater than a threshold confidence factor value; and
   responsive to the confidence factor value being greater than the threshold confidence factor value, initiating, by one or more processors, a communication with a computing device of the user, wherein the communication includes the activity recommendation.

3. The method of claim 1, further comprising:
   determining, by one or more processors, a respective confidence value for one or more conditions of the future set of conditions based on respective condition elements to generate an overall confidence factor value for the generated recommendation.

4. The method of claim 3, wherein initiating the communication with the computing device of the user, further comprises:
   modifying, by one or more processors, one or more entries of an application of the computing device of the user based at least in part on the activity recommendation.

5. The method of claim 1, wherein determining the past activity of the user based at least in part on social media posts and IoT enabled devices of the user, further comprises:
   identifying, by one or more processors, the past activity of the user based at least in part on unstructured textual data of social media posts of the user;
   identifying, by one or more processors, a time the user engaged in the past activity based at least in part on timestamp data of the IoT enabled devices of the user; and
   identifying, by one or more processors, a past activity location of the user based at least in part on geolocation data of the IoT enabled devices of the user, wherein the past activity location corresponds to the time the user engaged in the past activity.

6. The method of claim 5, further comprising:
   determining, by one or more processors, a sentiment corresponding to the past activity based at least in part on the unstructured textual data of social media posts of the user; and
   determining, by one or more processors, a frequency of user engagement of the past activity over a defined time frame.

7. The method of claim 1, wherein determining the set of historical conditions corresponding to the past activity, further comprises:
   correlating, by one or more processors, condition elements of one or more sets of conditions of corresponding past activities of a frequency of user engagement of the past activity over a defined time frame.

8. The method of claim 1, wherein generating the activity recommendation based on the location of the user and the set of historical conditions corresponding to the activity, further comprises:
   retrieving, by one or more processors, one or more data feeds, wherein the data feeds include historical crowd data, historical weather information, historical traffic information, and a frequency of user engagement of the past activity;
   in response to identifying the location of the user, determining, by one or more processors, the set of future conditions of the future activity based at least in part on the location and the one or more data feeds;
   comparing, by one or more processors, condition elements of the set of historical conditions corresponding to the past activity with conditional elements of the set of future conditions of the future activity; and
   identifying, by one or more processors, a correlation in conditional elements that correspond to the positive sentiment of the user.

9. A computer program product comprising:
   one or more computer readable storage media and program instructions stored on the one or more computer readable storage media, the program instructions comprising:
   program instructions to determine a past activity of a user based at least in part on social media posts and internet of things (IoT) enabled devices of the user;
   program instructions to determine a set of historical conditions corresponding to the past activity;
   program instructions to identify a location of the user;
   program instructions to generate an activity recommendation based on the location of the user and the set of historical conditions corresponding to the past activity, wherein the activity recommendation includes a set of future conditions of a future activity, wherein the set of future conditions correlate with the set of historical conditions; and
   program instructions to determine a confidence factor value of the set of future conditions of the future activity based at least in part on the set of historical conditions corresponding to the past activity, the confidence factor value providing an indication of the set of future conditions of the future activity corresponding to a positive sentiment of the user.

10. The computer program product of claim 9, further comprising program instructions, stored on the one or more computer readable storage media, to:

determine whether the confidence factor value of the set of future conditions is greater than a threshold confidence factor value; and responsive to the confidence factor value being greater than the threshold confidence factor value, initiate a communication with a computing device of the user, wherein the communication includes the activity recommendation.

11. The computer program product of claim 9, further comprising program instructions, stored on the one or more computer readable storage media, to:

determine a respective confidence value for one or more conditions of the future set of conditions based on respective condition elements to generate an overall confidence factor value for the generated recommendation.

12. The computer program product of claim 11, wherein program instructions to initiate the communication with the computing device of the user, further comprise program instructions to:

modify one or more entries of an application of the computing device of the user based at least in part on the activity recommendation.

13. The computer program product of claim 9, wherein program instructions to determine the past activity of the user based at least in part on social media posts and IoT enabled devices of the user, further comprise program instructions to:

identify the past activity of the user based at least in part on unstructured textual data of social media posts of the user;

identify a time the user engaged in the past activity based at least in part on timestamp data of the IoT enabled devices of the user; and identify a past activity location of the user based at least in part on geolocation data of the IoT enabled devices of the user, wherein the past activity location corresponds to the time the user engaged in the past activity.

14. The computer program product of claim 13, further comprising program instructions, stored on the one or more computer readable storage media, to:

determine a sentiment corresponding to the past activity based at least in part on the unstructured textual data of social media posts of the user; and determine a frequency of user engagement of the past activity over a defined time frame.

15. The computer program product of claim 9, wherein program instructions to determine the set of historical conditions corresponding to the past activity, further comprise program instructions to:

correlate condition elements of one or more sets of conditions of corresponding past activities of a frequency of user engagement of the past activity over a defined time frame.

16. The computer program product of claim 9, wherein program instructions to generate the activity recommendation based on the location of the user and the set of historical conditions corresponding to the activity, further comprise program instructions to:

retrieve one or more data feeds, wherein the data feeds include historical crowd data, historical weather information, historical traffic information, and a frequency of user engagement of the past activity;

in response to identifying the location of the user, determine the set of future conditions of the future activity based at least in part on the location and the one or more data feeds;

compare condition elements of the set of historical conditions corresponding to the past activity with conditional elements of the set of future conditions of the future activity; and identify a correlation in conditional elements that correspond to the positive sentiment of the user.

17. A computer system comprising:
one or more computer processors;
one or more computer readable storage media; and
program instructions stored on the computer readable storage media for execution by at least one of the one or more processors, the program instructions comprising:

program instructions to determine a past activity of a user based at least in part on social media posts and internet of things (IoT) enabled devices of the user;

program instructions to determine a set of historical conditions corresponding to the past activity;

program instructions to identify a location of the user;

program instructions to generate an activity recommendation based on the location of the user and the set of historical conditions corresponding to the past activity, wherein the activity recommendation includes a set of future conditions of a future activity, wherein the set of future conditions correlate with the set of historical conditions; and program instructions to determine a confidence factor value of the set of future conditions of the future activity based at least in part on the set of historical conditions corresponding to the past activity, the confidence factor value providing an indication of the set of future conditions of the future activity corresponding to a positive sentiment of the user.

18. The computer system of claim 17, further comprising program instructions, stored on the one or more computer readable storage media for execution by at least one of the one or more processors, to:

determine whether the confidence factor value of the set of future conditions is greater than a threshold confidence factor value; and responsive to the confidence factor value being greater than the threshold confidence factor value, initiate a communication with a computing device of the user, wherein the communication includes the activity recommendation.

19. The computer system of claim 17, further comprising program instructions, stored on the one or more computer readable storage media for execution by at least one of the one or more processors, to:

determine a respective confidence value for one or more conditions of the future set of conditions based on respective condition elements to generate an overall confidence factor value for the generated recommendation.

20. The computer system of claim 17, wherein program instructions to generate the activity recommendation based on the location of the user and the set of historical conditions corresponding to the activity, further comprise program instructions to:

retrieve one or more data feeds, wherein the data feeds include historical crowd data, historical weather information, historical traffic information, and a frequency of user engagement of the past activity;

in response to identifying the location of the user, determine the set of future conditions of the future activity based at least in part on the location and the one or more data feeds;

compare condition elements of the set of historical conditions corresponding to the past activity with conditional elements of the set of future conditions of the future activity; and
identify a correlation in conditional elements that correspond to the positive sentiment of the user.

* * * * *